Aug. 26, 1941.  W. F. ZIMMERMANN  2,254,163
SHAPER CROSSRAIL LUBRICATING SYSTEM
Filed Nov. 4, 1939  2 Sheets-Sheet 1
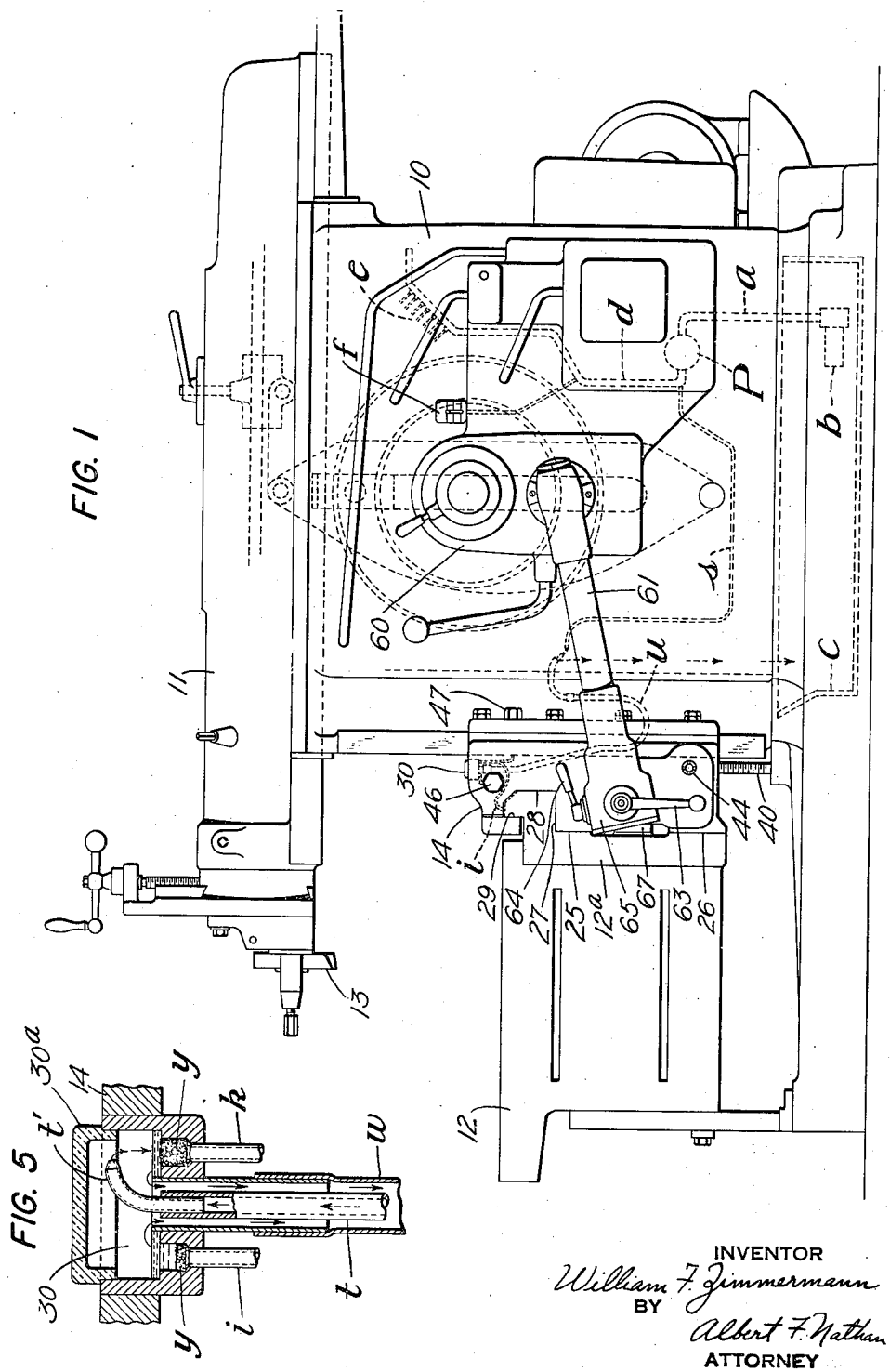
INVENTOR
William F. Zimmermann
BY
Albert F. Nathan
ATTORNEY

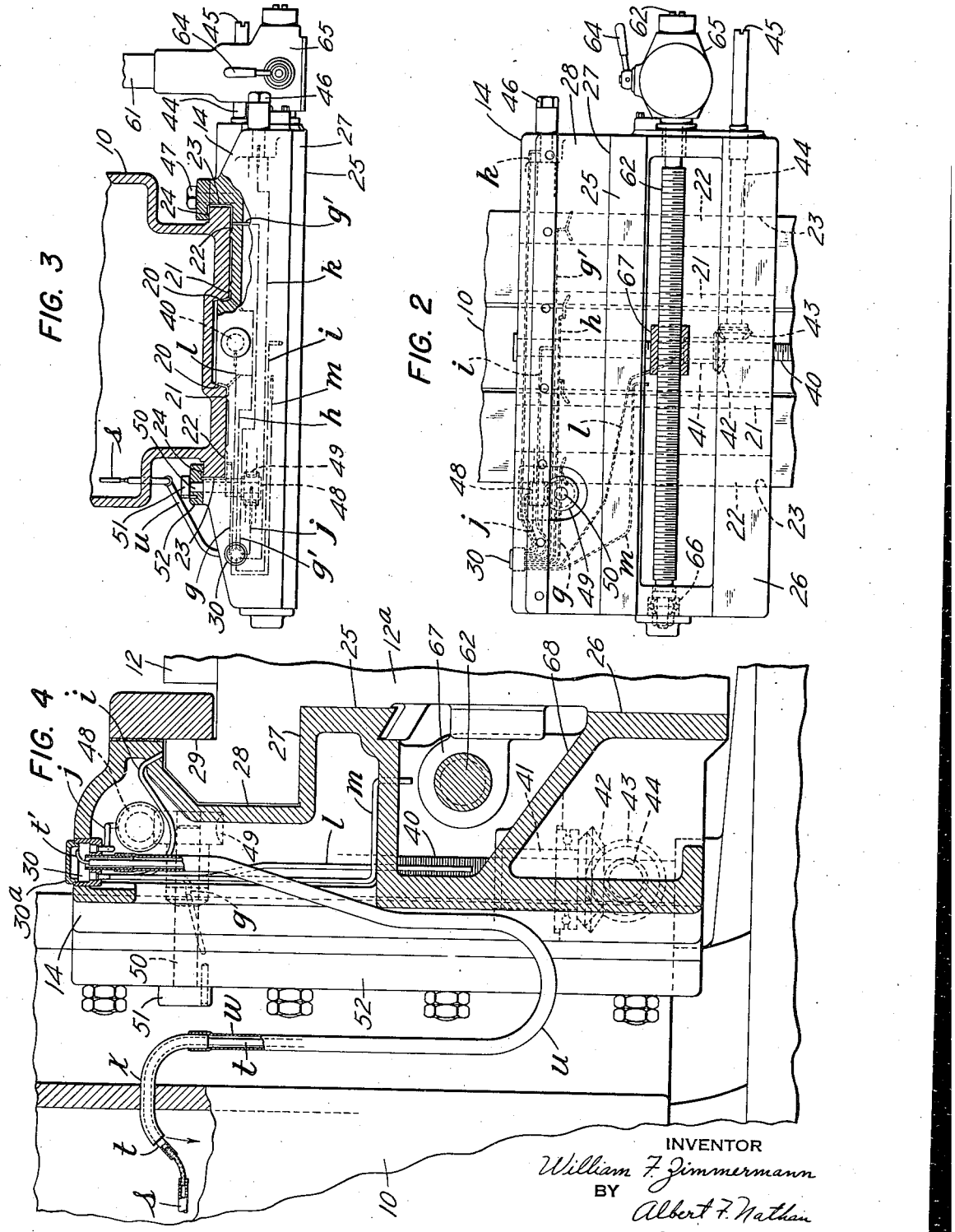

Patented Aug. 26, 1941

2,254,163

UNITED STATES PATENT OFFICE 2,254,163

SHAPER CROSSRAIL LUBRICATING SYSTEM

William F. Zimmermann, Maplewood, N. J., assignor to Gould & Eberhardt, Newark, N. J., a corporation of New Jersey Application November 4, 1939, Serial No. 302,823

6 Claims. (Cl. 184—6)

The present invention relates to devices for lubricating relatively movable parts of machine tools and is concerned more particularly with an improved means for lubricating the bearing surfaces of shaping machine crossheads and cross-slides and their actuating mechanisms.

A primary aim of the invention is to insure adequate lubrication of the bearing surfaces of the externally mounted and movable crosshead and cross-slide members so as to promote freedom of movement of the parts at all times and to avoid undue wear on such surfaces that would otherwise be occasioned by the lack or absence of sufficient and proper lubrication.

A further aim of the invention is to supply the bearing surfaces, feed screws, etc., of such machines with a continuous, but not a too copious, flow of lubricant automatically throughout the normal operation of the machine, and also to insure adequate lubrication of the bearings and surfaces during such time the parts are actuated manually, as when adapting and relating the table, rail, and frame elements of a shaper for a particular tooling set-up.

Another aim of the invention is to eliminate the necessity for the manual squirt can method of oiling, which at best is questionable in its efficiency, and to render available an oiling system that is practically certain and highly efficient in operation from the standpoint both of furnishing an adequate supply of fresh lubricating material to all moving surfaces, and from the standpoint of conservation in lubricating material.

Still another aim of the invention is to equip the translatable crosshead of a machine tool, such as a shaper, with a means for adequately lubricating not only its own supporting and bearing surfaces, but as well the bearing surfaces and actuating mechanism of the member or members translatably supported thereon, and to effect such lubricating by a system of preferably concealed oil feed conduits, that derive their supply from a common source or sources carried on the movable crosshead. The invention further aims toward a construction whereby the lubricant may be supplied to the crosshead from within the main frame of the machine through a flexible connection which permits supply and return flows of lubricant to occur simultaneously. By this invention a continuous circulation of lubricant is maintained between the distributor on the movable member and the main base and source of supply, and whereby periodic changes in the main supply effects a similar change in the oil at all parts of the machine.

In attaining the objectives of this invention, it is proposed to imbed in or otherwise provide the crosshead of the machine with a lubricant distributing chamber or reservoir and run a number of restricted oil lines therefrom to the several critical regions of all shaft and bearing surfaces to be lubricated. Preferably the various oil lines will be concealed within the frame work of the crosshead and will comprise both fixed metal conduits and drilled connecting conduits. In this way, the movable crosshead carries within itself its entire system of lubrication which operates to supply oil at a limited rate to all critical regions thereof.

So that the system may be repeatedly and continuously supplied with fresh quantities of lubricant, it is further proposed to connect the crosshead distributing chamber with one of the pressure lines within the main frame of the machine. To that end, a flexible conduit, of a length sufficient to allow maximum freedom in crosshead movements, is provided which leads from the distributor to a point in the pressure system within the main frame. Throughout the period the machine is running, the distributor will therefore be kept adequately supplied with oil. And to prevent the main pressure pump from building up an equal pressure in the crosshead feed lines and hence an excess and waste of oil at the various bearing and guide surfaces, a return line for excess lubricant is provided.

If desired the return line may be a separate conduit. However, as this invention further aims to reduce the number of connections and hence reduce leakage points, it is proposed that the return flow take place within the same connection that furnishes the pressure supply. But one flexible connection is, therefore, required and which is arranged to convey lubricating medium both to and from the crosshead distributor. Accordingly, a substantially free circulation of oil is maintained between the movable oiling system and the stationary system within the main frame. And as but one flexible connection is employed, the entire assembly presents a neat aspect and one that is highly efficient in operation, notwithstanding that the lubricating material is to be delivered ultimately to a large number of remotely located regions, most of which are normally inaccessible to the attendant.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:

Figure 1 is a side view of a shaping machine embodying the present invention.

Fig. 2 is a front view of the shaper crosshead with the table slide removed.

Fig. 3 is a plan view partly in section of the crosshead and its mounting.

Fig. 4 is a vertical section through the crosshead illustrating the elevated position of the crosshead distributor when the crosshead is in its lowermost position.

Fig. 5 is a vertical section through the crosshead distributor.

Referring more particularly to Fig. 1, the shaper illustrated comprises essentially a main frame 10 and a reciprocable tool carrying ram 11 mounted on ways at the top thereof. A vertically adjustable and laterally translatable work table 12 is mounted upon the main frame in underlying relation with respect to the tool 13. Power means of conventional design is provided within the frame for reciprocating the ram and for feeding the work table laterally on the crosshead 14. Inasmuch as the power drive is well known and forms no part of the present invention, it need not be explained except to state that a connection therefrom drives a lubricating pump P.

The lubricant pump receives oil through a conduit $a$ from an automatically cleaned filter $b$ located in a basin $c$ which underlies the power transmission mechanism of the main frame. The output of the pump flows through a conduit $d$ from which branch lines $e$ carry the lubricant to all parts to be lubricated within and enclosed by the main frame. A gauge $f$ continuously registers the oil pressure furnished to the moving parts and such excess that is supplied, cascades back to the basin $c$ where it is filtered before recirculation.

The lubricating system just explained is confined solely to the transmission mechanisms enclosed by the main frame of the machine and all moving parts external thereof such as the table 12 and crosshead 14 had their bearing surfaces and their immediate propelling mechanisms lubricated by hand. Manual lubrication is unreliable for the reason that frequently it is forgotten and also for the reason that certain surfaces and bearings should be supplied with lubricant continuously thereby to maintain freedom of movement and to prevent undue or localized wear. The present invention undertakes to provide a system of oiling for the shaper crosshead and cross-slide bearing surfaces and the moving elements journaled in such members so that the operator is assured that such moving parts are well lubricated at all times.

The critical bearings and surfaces requiring constant lubrication are illustrated more particularly in Figs. 2, 3 and 4 and include the narrow vertical guides 20 which maintain the crosshead in true alignment during vertical movement thereof; The front bearing surfaces 21 and 22 against which the crosshead is clamped when adjusted to the desired vertical height; and the outer and rear faces 23 and 24 of the crosshead vertical guideways.

The surfaces on the crosshead which support and guide the laterally adjustable table cross-slide 12ᵃ also require continuous lubrication for such slideways are continuously in use during the normal operation of the shaping machine. The important bearing surfaces to be lubricated are the front faces 25 and 26 which take the downward and rearwardly acting forces of the table 12; the wide top surface 27 which receives the downwardly acting thrusts on the work table and the surface 29 which in conjunction with the surfaces 25 and 27 form a Z-type lock between the table cross-slide and the crosshead of the shaping machine.

The bearing surfaces just explained are all outside of the main frame of the machine and in consequence pressure lubrication thereof is not feasible because of the inevitable dripping of the oil from those surfaces that would follow and give rise to not only a too hazardous and dangerous condition about the machine but result in a continual wasting of lubricating material.

By the present invention a system of lubrication is provided for the external bearing surfaces between relatively moving members which continuously delivers a slow feed of oil to the critical regions and in quantities sufficient to insure adequate lubrication thereof without undue flooding or waste of the oil. Fig. 4 of the drawings illustrates a preferred form of means for carrying out that objective which consists of imbedding or otherwise providing an auxiliary reservoir 30 in the crosshead 14 as to be movable bodily therewith. The reservoir 30 is located preferably at the highest position feasible on the crosshead and has a number of feed lines connected therewith that convey lubricant in restricted amounts to the several regions both near and far on the movable crosshead.

As illustrated in Figs. 2 and 3, the feed lines $g$ and $g'$ conduct a limited quantity of oil to the oil grooves extending about the surfaces 22, 23, 24, between the crosshead and the main frame; feed line $h$ conducts lubricant to both sets of bearing surfaces 20 and 21; and oil line $i$ conducts lubricant to the uppermost portion of the crosshead. The outlet of the oil line $i$ is located centrally of the crosshead so that oil will drip slowly on to the cross-slide in practically any laterally adjusted position thereof. Oil so delivered finds its way by gravity to the bearing surfaces 29, thence via clearance 28 to the horizontal bearing surface 27 and over the edge thereof to the vertical surface 25. The lower vertical surface 26 receives drippings from the screw shaft and nut mechanism 62, 67 as will later be explained. In this way oil slideway surfaces are kept supplied with a film of oil.

The mechanisms for elevating the crosshead and for feeding the table intermittently therealong also require continuous lubrication. These mechanisms include a non-rotatable vertical screw shaft 40 which is secured to the base of the machine and extends upwardly through a nut 41 journaled in the frame work of the crosshead. The elevating nut 41 is provided with a bevel gear 42 which is driven from a similar gear 43 journaled upon a horizontal shaft 44 extending to the operator's side of the machine. By placing a crank upon the end 45 of the shaft 44, the operator may raise or lower the crosshead and so adjust the height of the work table to the point required. When the correct height has been attained the crosshead is clamped to the main frame by operating the clamp shaft 46 and tightening clamp nut 47.

The clamp shaft 46 extends from the operator's side of the machine to the opposite side and is provided with a worm gear 48 that meshes with a gear 49 threaded to the inner end of a non-rotatable clamp stud 50. The stud 50 has its head end 51 locked against rotation to the clamp strap 52. Rotation of the clamp shaft 46 accordingly operates to clamp the far side of the crosshead firmly to the main frame of the machine. The near side of the crosshead is similarly clamped by tightening up the nut 47.

The worm gear and nut mechanism and the bearing for the clamp shaft 46 also receive a restricted supply of lubricant from the distributing chamber 30, through the feed lines $j$ and $k$, respectively. Oil from the feed line $j$ drops on top of the worm gear 48 and thereafter finds its way to the threads and journal bearing of the nut gear 49 and also to some extent laterally along the shaft to the outer bearing thereof. In a similar manner an oil feed line $l$ conducts oil from the distributor at a limited rate to threads of the elevating shaft 40 and nut 41 and also to the journal bearing of the nut.

Under normal conditions of operation the work table is fed at an intermittent rate laterally across the crosshead and the power therefore is derived from the interior of the main frame by conventional power feed mechanism enclosed in the casing 60. Intermittent or continuous power feed is transmitted through the extensible tubular connection 61 to a horizontal feed shaft 62 journaled in the crosshead. The feed shaft 62 also extends to a position available for direct manual operation by a crank 63 when the clutch lever 64 is in a neutral position.

The bearing for the shaft 62 at the operator's side of the machine receives lubricant from the housing 65 and the bearing 66 at the far side, may be initially packed with grease so as not to require attention for a considerable period of time and use. However, the screw threads of the feed shaft 62 and the threads of the cooperating nut 67, which is secured to the table cross-slide 12ª, should be afforded continuous lubrication so as to minimize wear and consequent replacement expense. To that end still another feed line $m$ conveys lubricant in restricted quantities to a point directly overlying the threads of the feed shaft 62 and somewhat centrally of the crosshead. Oil dripping from the line $m$ first lubricates the threads of the feed shaft and also the threads of the nut 67 as it is propelled therealong, and the excess drips to an inclined surface 68 of the crosshead structure and flows by gravity around and down the face of the lower vertical bearing surface 26 between the cross-slide and the crosshead. Lateral movement of the cross-slide on its bearing surfaces spreads the lubricant supplied thereto into a thin film over their total areas thereby adequately lubricating same without excess flooding or wasting of oil.

The capacity of the reservoir or distributing chamber 30 is of necessity relatively small so as not to interfere with the normal and expected uses to which a shaping machine is put, and a manual filling of the distributor would not suffice for any extended period of operation. This invention proposes therefore to keep the auxiliary reservoir completely filled with lubricant automatically throughout the normal operation of the machine and in a manner whereby no excess pressure is created in the various feed lines $(g-m)$ and, hence no flooding and wasting of lubricating material.

Figs. 1, 4 and 5 illustrate a preferred form of means for automatically keeping the distributor filled with fresh oil which consists in running a supply line $s$ from the main pressure line $d$ of the main system to the tube $t$ of a bi-tubular flexible conduit $u$ leading to the crosshead mounted reservoir 30. The discharge end of the flexible tube $t$ is curved and tapered as at $t'$ to form a restricted passageway for the flow of pressure lubricant into the auxiliary reservoir. By so restricting the discharge end of the flexible tube, a limited but continuous supply of lubricant is furnished by the pump P to the translatable and externally mounted reservoir throughout the period of normal operation of the shaping machine.

The auxiliary reservoir is provided with a removable cover 30ª, preferably made of transparent material such as an acetate so that the operator may conveniently inspect the oil level and flow at any instant. If the quantity delivered through the tip $t'$ is too great or too little, a new tip may be substituted therefore, merely by removing the cover 30ª and extending the tube $t$ a sufficient distance to permit the interchange. The curved formation of the tip $t'$ directs the flow away from the transparent cover 30ª and over the side of the return tube $u$ and at the same time functions as a hook which prevents the inner tube, which is free to move endwise to allow for bending, from falling below the receiving end of the return tube.

Preferably the feed lines $g-m$ leading out of the reservoir to the various external surfaces and bearings of the crosshead will be of relatively small diameter, for example, $\frac{5}{32}$ of an inch, which will by virtue of their small bore, afford a slow feed of lubricating material of a serviceable consistency. However, if a lubricant of a lower viscosity is employed and or it is desired differently to control the rate of feed in the several lines to suit requirements at the different locations, each feed line may further be restricted by placing a wick $y$ at its end of such material and of such length as may be necessary to effect a slow filtering of the oil at a preselected rate. Fig. 5 illustrates two feed lines, $i$, $k$, differently packed to suit their respective needs.

After a period of operation of the machine the distributor 30 will have become filled with lubricating material from the pressure pump and which, ordinarily, would place all of the feed lines leading therefrom under pressure equal to that delivered by the pump P and cause an excessive flow of oil to the various surfaces uselessly flooding the same. To guard against such a condition a second oilproof flexible tube is employed for carrying off the excess lubricant delivered to the reservoir 30. Preferably the overflow tube $u$ is constructed so as to surround the pressure tube $t$ and forms therewith a single flexible bi-tubular connection between the movable crosshead 14 and the stationary frame 10 of the shaping machine. As shown more clearly in Figs. 4 and 5, the outer tube $u$ is of such diameter relative to the inner tube as to leave ample space between their respective walls so as to permit an unobstructed flow of lubricating material back to the main frame. This return flow will be a gravity flow and for that reason the highest point *x* in the return line is located at a point below the inlet to such return line when the crosshead is in its lowermost position. If desired the connection between the interior of the main frame and the flexible conduit *u* may be of metal and welded to the main frame in a manner definitely excluding any leakage joint. In this way there is provided a single oilproof flexible connection between the stationary member of the machine and the movable member which serves as a means for supplying lubricating material to a movable reservoir and also as a means for circulating excess material back to the main pressure system within the stationary frame.

Without further analysis, the foregoing will so fully reveal the gist of this invention that others can, by applying current knowledge readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. A lubricating system for the bearings and ways of relatively movable elements of a machine tool comprising, a main lubricant reservoir in the stationary portion of the machine, an auxiliary reservoir carried by the movable element of the machine and situated at a point more elevated than the main reservoir, a pump adjacent said main reservoir and connections therefrom to said auxiliary reservoir on the movable member including a flexible bi-tubular member, one tube of said flexible member being connected to the discharge side of the pump and also with the auxiliary reservoir, and the other tube of the member being connected to establish an open communication between said two reservoirs so as to circulate the excess of lubricant supplied to the more elevated auxiliary reservoir back to said main reservoir by gravity, at least one of said tubes being mounted to move endwise relative to the other on bending and being provided with a hook portion which extends beyond and overlies the intake end of the said other tube to restrain the endwise movable tube against falling below said intake end; and a system of oil conduits communicating with said auxiliary reservoir and with the bearing surfaces between said relatively movable elements for feeding lubricating material thereto.

2. An oiling system for lubricating the bearings and ways of a shaping machine crosshead comprising, a main lubricant reservoir in the base of the machine, an auxiliary reservoir in said crosshead, a pump adjacent said main reservoir and connections therefrom to said auxiliary reservoir including a pair of concentric tubes, the inner one of said tubes being connected to the pump and to the auxiliary reservoir, and the outer one of said tubes being also connected to the auxiliary reservoir for conveying the excess of lubricant supplied to the auxiliary reservoir back to said main reservoir, and the inner tube of said pair of concentric tubes extending into the auxiliary reservoir beyond the receiving end of the outer tube and having a hook at its end overlying the receiving end of the outer tube to maintain the extended relation of the inner tube to the outer tube in all positions of movement of the cross head relative to the said base of the machine; and a plurality of oil conduits carried by said crosshead and communicating with said auxiliary reservoir and with the bearing surfaces between said crosshead and the main frame of the machine and between the crosshead and the shaping machine work table support for feeding lubricating material slowly thereto.

3. An oiling system for lubricating the bearings and ways of the middle member of three relatively movable members of a machine tool comprising, a main lubricant reservoir in the first of said members, an auxiliary reservoir in the second of said members, a pump adjacent said main reservoir and connections therefrom to said auxiliary reservoir including a bi-tubular flexible connection extending between said reservoirs and entering said auxiliary reservoir from the bottom thereof, one tube of said connection being connected so as to convey lubricant supplied by the pump to the auxiliary reservoir and extending into the latter a substantial distance beyond the end of the other tube, and the said other tube of the connection extending into the auxiliary reservoir a predetermined distance so that the projecting wall thereof limits the capacity of the auxiliary reservoir and the excess of lubricant supplied to the auxiliary reservoir overflows thereinto and is conveyed thereby back to said main reservoir in said first member, and oil lines carried by the second member and communicating with said auxiliary reservoir for conveying lubricant from the auxiliary reservoir to selected bearing surfaces between said three relatively movable members.

4. An oiling system for lubricating elements in or on a movable crossrail of a shaping machine combining a main reservoir in the stationary frame or base of the shaper; a relatively small auxiliary reservoir on the movable crossrail of the shaper and movable therewith; a system of oil lines also in the movable crossrail adapted to receive oil from said auxiliary reservoir and to conduct same by gravity to various bearings and areas thereof requiring lubrication; and means for maintaining said movable auxiliary reservoir supplied with oil from within said stationary frame comprising pump means located in the stationary frame of the shaper and a bi-tubular flexible conduit connection extending between the stationary main frame of the shaper and the auxiliary reservoir on the movable crossrail thereof, the inner tube of said flexible connection being in communication with the discharge side of said pump means and also with the interior of said movable reservoir for supplying lubricant thereto, and the outer tube of said bi-tubular flexible connection also communicating with said movable auxiliary reservoir at a point therein above the bottom thereof and with the interior of said stationary frame for returning thereto excess lubricating material supplied to the auxiliary reservoir by said pump means, said flexible bi-tubular conduit connection providing for an uninterrupted flow of lubricant to and from the auxiliary reservoir irrespective of the motion or position of the crossrail relative to the stationary main frame, and requiring a sealing of only the outer tube of the connection with the main frame and with the auxiliary reservoir to prevent leakage from both tubes.

5. An oiling system for lubricating elements in or on a movable member of a machine tool combining a main reservoir in the stationary frame or base of the machine; a relatively small auxiliary reservoir on the movable member of the machine and movable therewith; a system of oil lines also carried by the movable member adapted to receive oil from said auxiliary reservoir and to conduct same to various bearings and areas thereof requiring lubrication; and means for maintaining said movable auxiliary reservoir supplied with oil from within said stationary frame comprising pump means located in the stationary frame of the machine and a bi-tubular flexible conduit connection extending between the said stationary main frame and the auxiliary reservoir on the movable member thereof, the inner tube of said flexible connection being in communication with the discharge side of said pump means and also with the interior of said movable reservoir for supplying lubricant thereto, and the outer tube of said bi-tubular connection also communicating with said movable auxiliary reservoir at a point slightly above the inlets of said system of oil lines and with the interior of said stationary frame for returning lubricating material overflowing thereinto back to said stationary frame, said flexible bi-tubular conduit connection requiring only the sealing of the outer tube with the main frame and with the auxiliary reservoir to prevent leakage from both tubes and providing for an uninterrupted flow of lubricant to and from the auxiliary reservoir irrespective of the motion or position of the movable member relative to the stationary main frame.

6. In a machine tool having main frame and a vertically movable member mounted exteriorly of the frame the combination of means for supplying lubricating material in limited quantities to various regions and bearing areas of said vertically movable member including a main reservoir in said main frame, an auxiliary reservoir mounted on said vertically movable member at a point above the surfaces and bearing areas thereon to be lubricated, a pump means in the main frame, a pair of concentrically related flexible tubes extending between said main frame and the auxiliary reservoir on the movable member and being of a length sufficient to permit movement of the movable member from one extreme position of elevation to the lowest, and the inner of said pair of flexible tubes being connected to the pressure side of said pump means in the main frame and with said auxiliary reservoir on said vertically movable member, and said outer tube of said pair of flexible tubes, being connected to said movable member and in open communication at one end with said auxiliary reservoir and being also connected with said main frame and in open communication with the interior thereof at its other end, said last named connection being below the lowest position reached by the movement of the auxiliary reservoir with said vertically movable member so the lubricating material overflowing thereinto from said auxiliary reservoir will be conducted back to the interior of the main frame by gravity, and a system of oil conduits carried wholly by the movable member and communicating with said auxiliary reservoir thereon for conducting lubricating material therefrom by gravity to selected regions thereof.

WILLIAM F. ZIMMERMANN.